United States Patent [19]

Galbi et al.

[11] Patent Number: 4,928,259
[45] Date of Patent: May 22, 1990

[54] STICKY BIT PREDICTOR FOR FLOATING-POINT MULTIPLICATION

[75] Inventors: David Galbi, Mountain View; Les Kohn, San Jose, both of Calif.

[73] Assignee: Intel Corporation, Santa Clara, Calif.

[21] Appl. No.: 248,740

[22] Filed: Sep. 23, 1988

[51] Int. Cl.[5] .......................... G06F 7/38; G06F 7/52
[52] U.S. Cl. .................................. 364/745; 364/757
[58] Field of Search .................. 364/748, 715.10, 745, 364/757

[56] References Cited

U.S. PATENT DOCUMENTS

| | | | |
|---|---|---|---|
| 4,270,167 | 5/1981 | Koehler et al. | 364/200 |
| 4,338,675 | 7/1982 | Palmer et al. | 364/748 |
| 4,484,259 | 11/1984 | Palmer et al. | 364/754 |
| 4,748,575 | 5/1988 | Ashkin et al. | 364/715.10 |
| 4,758,972 | 7/1988 | Frazier | 364/745 |

OTHER PUBLICATIONS

IEEE Standard for Binary Floating-Point Arithmetic, Aug. 1985, (ANS/IEEE Std. 754–1985).
Introduction to Arithmetic for Digital Systems Designers; Shlomo Waser and Michael Flynn; 1982; pp. 103–104.

Primary Examiner—Gary V. Harkcom
Assistant Examiner—Long T. Nguyen
Attorney, Agent, or Firm—Blakely, Sokoloff, Taylor & Zafman

[57] ABSTRACT

In a floating-point multiplication of two numbers in which a value of a sticky bit is needed, each of two trailing zero encoders calculates the number of trailing zeroes associated with its mantissa. The sum of the two trailing zero counts determines the number of trailing zeroes in the mantissa product. This sum is compared to a constant to determine the sticky bit. Each encoder is comprised of a plurality of individual encoders arranged in a plurality of rows for providing the trailing zero count.

10 Claims, 3 Drawing Sheets

FIG_1
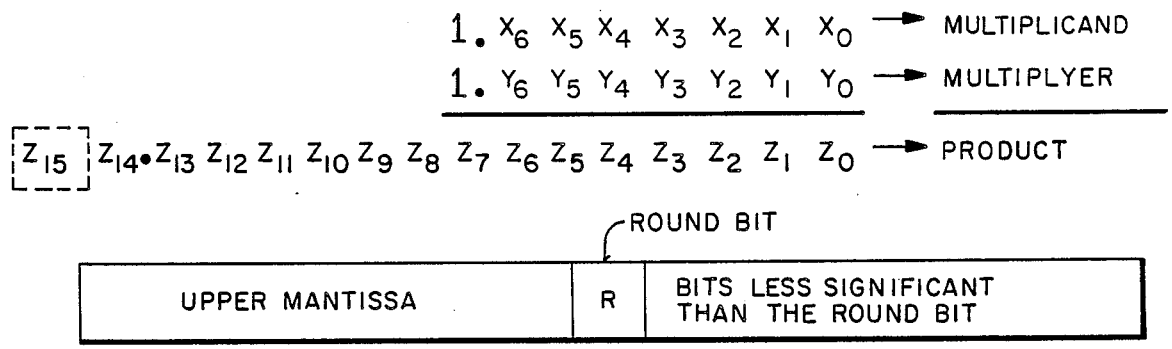
| UPPER MANTISSA | R | BITS LESS SIGNIFICANT THAN THE ROUND BIT |
ROUND BIT
FIG_2
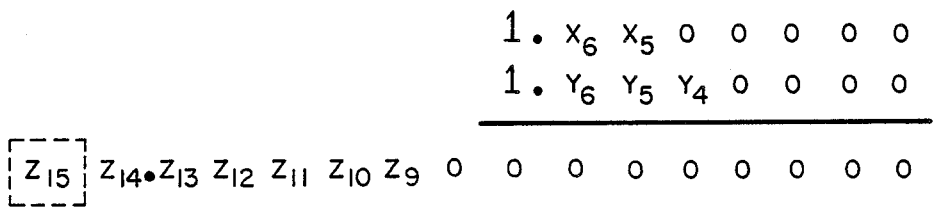

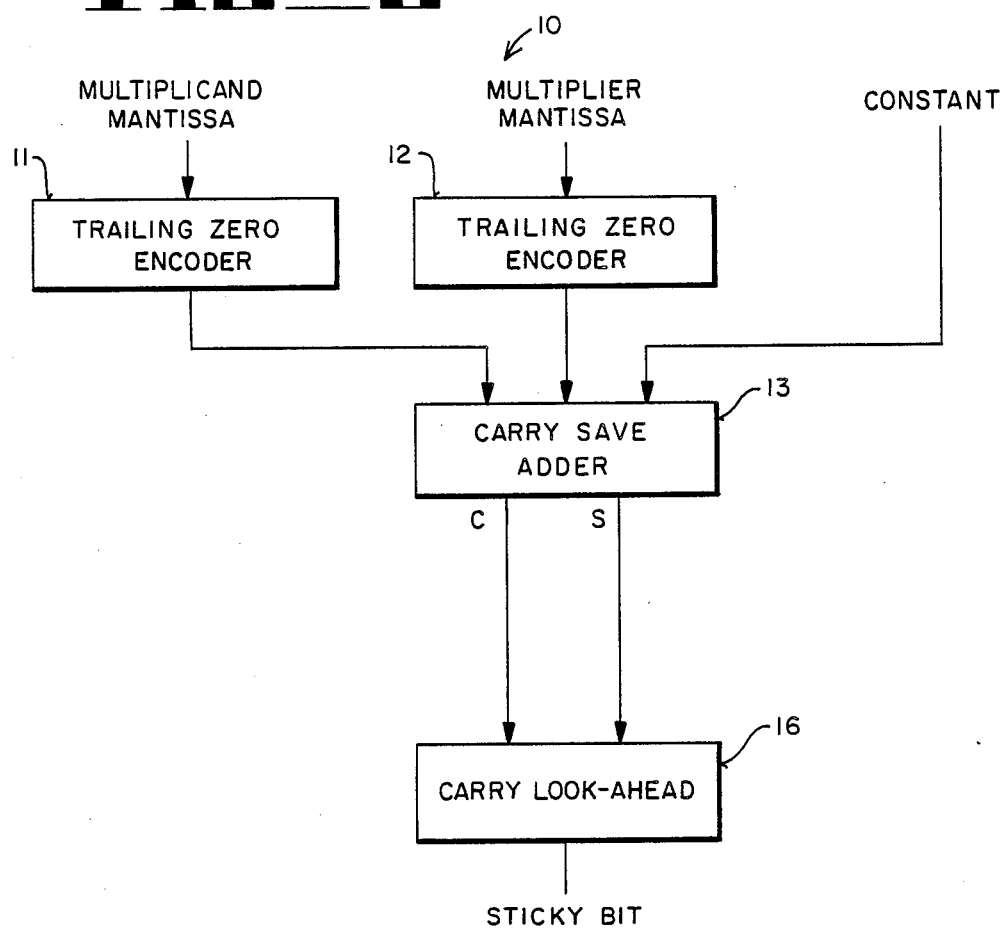
FIG_3
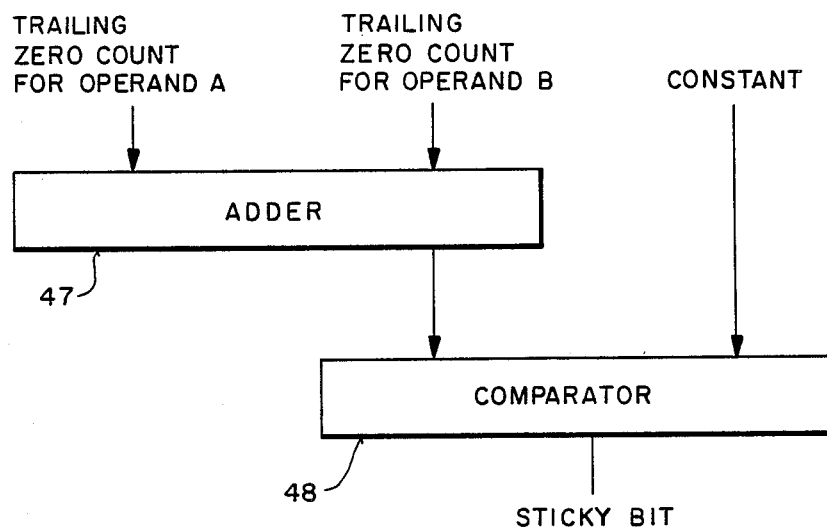
FIG_5

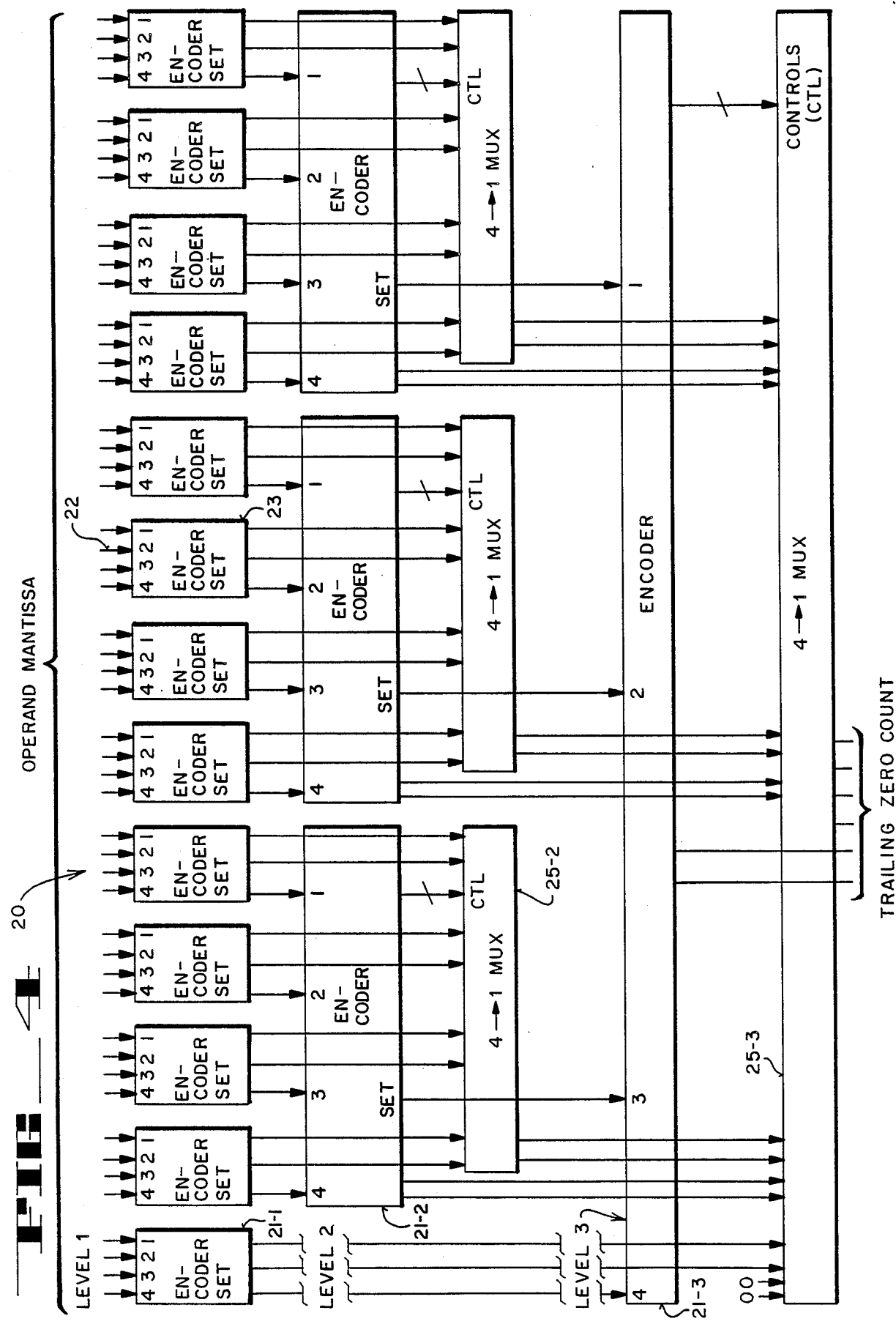

STICKY BIT PREDICTOR FOR FLOATING-POINT MULTIPLICATION

BACKGROUND OF THE PRESENT INVENTION

1. Field of the Invention

The present invention relates to the field of digital multipliers and more specifically to the prediction of a sticky bit.

2. Prior Art

The multiplication of two numbers is a basic arithmetic operation known in mathematics. However, implementing such an operation in a computer or a processor entails the difficulty of using hardware circuitry to provide the product of the two numbers. As processors are reduced to a semiconductor device, i.e. a silicon chip, additional constraints play a role in determining the best scheme for multiplying two numbers. Although various schemes are available to multiply two numbers, one of the most well-known techniques is the use of a tree structure, such as a Wallace Tree, to calculate the product. Additionally, whenever high-precision calculations or calculations involving very large and small numbers are required, processors implement floating-point multiplication for increase performance in arriving at the product.

Typically in a floating-point multiplier, the mantissas of the multiplicand and the multiplier are multiplied using a fast, tree type multiplier to derive the product. Various floating-point standards are available and one of the most well-known is the IEEE (The Institute of Electrical and Electronic Engineers, Inc.) Binary Floating-Point Standard 754. The rounding requirements of this floating-point standard require the use of a round bit and a sticky bit when performing floating-point multiplication. The round bit is defined as the bit of the unrounded mantissa product that is one position less significant than the least significant bit used in the result mantissa. The sticky bit is defined as the OR of all of the bits in the unrounded mantissa product less significant than the round bit. The existing prior art implementations require the calculation of all or part of the mantissa product before the sticky bit can be calculated. That is, once the mantissa product is calculated, then the appropriate bits are OR'ed to determine the sticky bit.

In another faster implementation of the prior art technique, the sticky bit is calculated as the product is calculated in several steps. This prior art technique calculates the lowest few bits of the mantissa product in a first clock cycle and during a second clock cycle, the next few bits of the mantissa product are calculated; and the OR of the mantissa product bits from the first clock cycle is calculated during this second clock cycle. Each additional clock cycle would calculate a few more bits of the mantissa product and OR together the bits of the mantissa calculated in the previous clock cycle. It is not a problem to calculate the sticky bit by this technique because several clock cycles are needed to calculate the product However, even with the implementation of this faster technique, the mantissa product or a portion of the mantissa product still needs to be calculated before the OR'ing to determine the sticky bit can be done.

The disadvantage of the prior art technique is self-evident in that the sticky bit can only be calculated after the calculation of the mantissa product. This adds delay to the processing operation because the rounding operation cannot begin until the sticky bit is known and the sticky bit cannot be determined until the lower half of the mantissa product is known. Therefore, it would be advantageous to develop a scheme in which the sticky bit can be calculated prior to or at the same time that the product is derived. Simply, a parallel processing technique is required to determine the sticky bit while the processor is determining the product of the two mantissas. This will allow a reduction of the delay in the multiplication operation of a processor because the sticky bit will be known when the lower half of the mantissa product is calculated. This technique is especially important as processor speed increases and operations must be performed in less time than the prior art.

SUMMARY OF THE PRESENT INVENTION

The present invention describes a circuit and a method for predicting the value of a sticky bit in a floating-point multiplication application. A multiplicand operand mantissa and a multiplier operand mantissa are each coupled as inputs to a trailing zero encoder. Each trailing zero encoder determines the number of trailing zeroes in its respective mantissa. This number is provided as a trailing zero count from the two trailing zero encoders. The sum of the number of trailing zeros from each operand mantissa is then compared with a constant to determine the sticky bit.

The preferred embodiment implements a special circuit for each of the trailing zero encoders to provide the trailing zero count. Each trailing zero encoder is comprised of a plurality of encoders arranged in a plurality of rows. The operand mantissa is coupled as input to a first row of encoders and output from each row of encoders is coupled to encoders of a subsequent row. The first row encoders provide the least significant bits of the trailing zero count and each subsequent row provides subsequently more significant bits of the trailing zero count, until the final row is reached, wherein its encoder provides the most significant bits of the trailing zero count. Multiplexors are also coupled to the various encoders for selecting the output of the proper encoder having the least significant non-zero bit.

BRIEF DESCRIPTION OF THE DRAWINGS

FIG. 1 is a diagram showing a multiplication operation of two operand mantissas and a resulting product.

FIG. 2 is a diagram showing a derivation of a trailing zero count by a summation of trailing zeroes in the operand mantissas.

FIG. 3 is a block schematic diagram of a sticky bit predictor of the preferred embodiment.

FIG. 4 is a block schematic diagram of a trailing zero encoder shown in FIG. 3.

FIG. 5 is a block schematic diagram of an alternative embodiment of a sticky bit predictor.

DETAILED DESCRIPTION OF THE PRESENT INVENTION

A circuit and a method for predicting the sticky bit of a floating-point multiplication is described. In the following description, numerous specific details are set forth such as specific circuits, etc., in order to provide a thorough understanding of the present invention. It will be obvious, however, to one skilled in the art that the present invention may be practiced without these specific details. In other instances, well-known structures and methods have not been described in detail in order not to unnecessarily obscure the present invention.

Referring to FIG. 1, a multiplication operation of two numbers X and Y is shown. The first number X is the multiplicand and the second number Y is the multiplier in this example. Further, both numbers X and Y are shown to have eight numerical positions. Both X and Y are normalized numbers because they are greater than or equal to one and are strictly less than two. If $X_0$-$X_6$ were all zeros, X would be exactly equal to one. If $X_0$-$X_6$ were all ones, X would be slightly less than two. The range of possible values for X can be described by the notation [1, 2) where the square bracket indicates that 1 is included in the interval and the parenthesis indicates that 2 is not included in the interval.

When the multiplication operation is performed on these two numbers X and Y, a product Z is obtained. Product Z will have 16 numerical positions. Since X and Y are in the range [1, 2), the product of X and Y will be in the range [1, 4). The most significant bit of the product of X and Y, $Z_{15}$ in this example, determines if the product is in the range [1, 2) or the range [2, 4). If $Z_{15}$ is 0, the product Z is in the range [1, 2). If $Z_{15}$ is 1, the product is in the range [2, 4).

Once the product Z is derived, typically only the upper mantissa portion of the product is used. For example, if X and Y are represented by 8 digit positions 0-7, then the product will also have 8 digit positions. Further, the product Z will typically be a normalized number so the unrounded product bits will be either $Z_8$-$Z_{15}$ or $Z_7$-$Z_{14}$ depending on whether $Z_{15}$ is one. The most significant bit of a normalized number must be one. The lower half of the mantissa, either $Z_7$-$Z_0$ or $Z_6$-$Z_0$, will not be represented in the actual product. The most significant of the unused digits is referred to as the round bit. The sticky bit is the OR of all the bits less significant than the round bit. If $Z_{15}$ is zero, the round bit would be $Z_6$ and the sticky bit would be the OR of bits $Z_0$-$Z_5$. If $Z_{15}$ is one, the round bit would be $Z_7$ and the sticky bit would be the OR of bits $Z_0$-$Z_6$.

The round bit and the sticky bit determine if the upper portion of the mantissa product is either incremented or left unchanged to accomplish rounding. For example, in the round toward positive infinity mode of the IEEE Floating Point Standard 754, the upper portion of the mantissa product is incremented if the product is positive and either the round or sticky bit is one. The sticky bit being one indicates that the exact mantissa product ($Z_0$-$Z_{15}$) is greater than the upper portion of the mantissa product. Thus when rounding toward positive infinity, if the result is positive and the sticky bit is one, the upper portion of the mantissa product must be incremented.

As stated in the background section above, prior art techniques require the solving of the product prior to the determination of the sticky bit. That is, the bits less significant than the round bit could only be calculated by actually performing all or part of the multiplication. The present invention predicts the sticky bit from the operand mantissas assuming the mantissa product is in the range [1, 2). This prediction of the sticky bit is done in parallel with the computation of the mantissa product.

Referring to FIG. 2, the present invention takes into account that the number of trailing 0s in a product is equal to the sum of the trailing 0s in the multiplicand and the multiplier. A hypothetical example is shown in FIG. 2. If X had 5 trailing 0s and Y has 4 trailing 0s, then the product will have a total of 9 (5+4) trailing 0s. Since the sticky bit is the OR of bits $Z_0$-$Z_5$ (assuming the mantissa product is in the range [1, 2)), the sticky bit will be zero if the mantissa product has 6 or more zeros. Since the mantissa product has 9 zeros in this example, the sticky bit would be zero. Therefore the value of the sticky bit can be predicted by counting the number of trailing 0s in the multiplicand and multiplier mantissa and comparing the sum of the trailing zero counts to a constant.

This prediction can be achieved in a separate circuit while the two numbers are being multiplied by the use of a known technique, so that parallel determination of the sticky bit can be achieved while the two numbers are being multiplied. Therefore, it is the intent of the present invention to predict the sticky bit value by determining the total number of trailing 0s in the multiplicand and the multiplier. That is, the sticky bit is predicted from the operand mantissas instead of OR'ing the bits of the lower mantissa product.

Referring to FIG. 3, a block diagram of the circuit of the present invention is shown. Circuit 10 is comprised of trailing zero encoders 11 and 12. Trailing zero encoder 11 is coupled to accept the multiplicand mantissa as its input, while encoder 12 is coupled to accept the multiplier mantissa as its input. Each of the encoders 11 and 12 determines the number of trailing 0s in its respective operand mantissa. Then, encoders 11 and 12 are coupled to a carry save adder 13, wherein an output from each of the encoders 11 and 12 provides the number of trailing 0s in its operand mantissa. The carry save adder 13 is also coupled to accept as its input a constant. The constant is chosen to give a carry out of the carry look-ahead circuit 16 in the event the sticky bit is a 0. The carry save adder 13 provides two numbers (C and S) whose sum is the same as the sum of its three inputs. The operation of a carry save adder is well-known in the prior art and, further, such carry save adder is described in *Introduction to Arithmetic for Digital Systems Designers*, by Shiomo Waser and Michael Flynn, 1982, Page 103-104.

The two outputs from the carry save adder 13 are coupled to carry look-ahead circuit 16 which then determines the sticky bit. For example, if the operand mantissa were 8-bit numbers as shown in FIG. 1, the sticky bit would be zero if the sum of the trailing zero counts were greater than or equal to 6. In this example a constant of 10 could be added to the sum of the trailing zero counts. The carry look-ahead circuit would determine if the sum of the two trailing zero counts and the constant 10 was greater than or equal to 16. If the sum of these three numbers is greater than or equal to 16, the sticky bit would be zero.

The purpose of carry save adder 13 and carry look-ahead circuit 16 is to determine if the sum of the two trailing zero counts is greater than a constant. It will be obvious to one skilled in the art that there are many variations of this circuit to accomplish this task. One variation is shown in FIG. 5. It should be clear that the present invention is not limited to the two variations shown in FIGS. 3 and 5.

Referring to FIG. 5, an alternative embodiment to the circuit of FIG. 3 for predicting the sticky bit is shown. The outputs from the two tailing zero encoders, such as encoders 11 and 12 of FIG. 3, are provided to an adder 47 which sums the total count of the 0s and provides that as an output to comparator 48. The comparator is also coupled to receive a constant as an input. The output of the comparator provides the sticky bit value. For the example of FIG. 1, the constant in FIG. 5 would be 6. The comparator would make the sticky bit zero if the sum of the trailing zero counts from adder 47 is greater than or equal to 6.

Referring to FIG. 4, a circuit 20 for determining the trailing 0 count is shown. Circuit 20 is included in each of the trailing zero encoders 11 and 12 of FIG. 3. The first level of circuit 20 is comprised of a plurality of encoders 21-1 for accepting one of the operand mantissas as its input. Thirteen encoders 21-1 are shown wherein each encoder accepts 4 different bits of the mantissa. A total of 13 encoders 21 are provided to accept a 52 bit operand mantissa, because the processor of the preferred embodiment is designed to operate on a 52 bit operand mantissa for its floating-point multiplication. Although a particular number of bits is provided for the operand mantissa in this example, it is to be appreciated that the number of bits comprising the operand mantissa is a design choice and will depend on the actual processor design.

Each encoder 21 accepts 4 bits as its input and generates a 2 bit output, as well as a set signal. The set signal from each encoder 21 is the result of the OR'ing of its 4 inputs. Therefore, if the 4 inputs are all 0s, then the set signal will also be 0. However, if one or more of the 4 inputs to the encoder 21 has a value of 1, then the set signal will also have a value of 1. When the set signal is a 1, the other two output lines from encoder 21 will provide a code for identifying the bit position of the very first 1 that is encountered. Various prior art encoders can be used to provide the function of encoder 21, one such encoder is Part No. 74148 manufactured by Texas Instruments, Inc.

For a hypothetical example, if there are 21 trailing 0s in a given operand mantissa, then the first 1 bit will be encountered at bit position 22 (also designated by reference numeral 22), such that the set value from encoder 23 will be a 1 and the output from encoder 23 will have a value, such as 01, to designate that its second input is the very first 1 encountered by encoder 23. If bit 22 has a value of 1 then the subsequent bit values are of no concern in determining the trailing 0 count. In this example, the set signal value of the encoders less significant than encoder 23 will then have a value of 0, such that the output from those encoders are of a "don't care" condition.

A plurality of second level encoders 21-2 are provided for accepting the set signals of the level one encoders 21-1 as its input. Because encoders 21-2 are equivalent to encoders 21-1 of level 1, the encoders of level 2 are arranged to accept four inputs and generate a set signal, as well as the position code designating the position of the first set signal of level 1 having a value of 1. Three encoders 21-2 are used on level 2 wherein set signals from 12 of the encoders 21-1 of level 1 are coupled as input to encoders 21-2 of level 2. Of course, the actual number of encoders 21 to be used at the various levels will depend on the actual number of bits comprising the operand mantissa.

The set signals from the level 2 encoders 21-2 are coupled to a level three encoder 21-3. The remaining encoder of level 1 (the 13th encoder position) is coupled as the fourth input to the encoder 21-3 of level 3. A level 2 encoder is not needed for this 13th encoder of level 1 because it is a solitary encoder when the encoders 21-1 are divided into groupings of four. Of course, if another encoder was present in level 1, a level 2 encoder must be used for the 13th and 14th level 1 encoders. It is to be noted that the various encoders 21 at the varous levels are arranged such that encoders representing the more significant bit positions are coupled as inputs having the more significant input position to the encoder of the next level. This is necessary to maintain the relative position of the first mantissa bit having a value of 1 which then translates to the fact that all bits less significant than the first 1 bit will have a value of 0.

Two levels of four-to-one MUXs 25 are utilized to select the appropriate encoder output. In circuit 20 a four-to-one MUX 25-2 is provided for each encoder of level 2. For each encoder of level 1 its output is coupled to the MUX 25-2 corresponding to the associated encoder 21-2. Appropriate control signals (CTL) are provided from the associated encoder 21-2 to its respective MUX 25-2 to select the output of the level 1 encoder which has the first set value of 1. Therefore, in the above example for the first 1 bit encountered at bit position 22, the output of that encoder 23 is coupled through the MUX 25-2 associated with that encoder 23.

The MUX 25-3 associated with the third level encoder 21-3 receives inputs directly from the level 2 encoders 21-2 and also from the corresponding first level encoders 21-1 through MUXs 25-2 associated with the level 2 encoder. Also, the most significant encoder of level 1 has its output coupled to the multiplexor 25-3. Because there is no level 2 encoder associated with this most significant encoder of level 1, two 0s are inputted to MUX 25-3 as shown in FIG. 4. The output of encoder 21-3 of level 3 provides the two most significant bits for the trailing 0 count, while the four-to-one MUX 25-3 associated with the level 3 encoder 21-3 provides the two pairs of bits which also determine the trailing 0 count. Control (CTL) lines are coupled to MUXs 25 from parent encoders 21 for providing control signals to MUXs 25.

Of the six bits which determine the trailing 0 count, the two most significant bits, determine which of the four groupings of the level 1 encoders has the first 1 bit (the least significant 1 bit value) in the operand mantissa. The middle two bits designate which encoder 21-1 in level 1 has the least significant 1 bit. Finally, the least significant two bits designate which bit of the selected encoder 21-1 of level 1 has the least significant 1 bit. Therefore, the six lines will determine the exact bit which is the least significant 1 bit in the operand mantissa. All bits less significant than the least significant 1 bit will have a value of 0.

It is to be appreciated that if the actual number of bits in the operand mantissa differs from the example, then less or additional circuitry can be implemented to the structure of FIG. 4 as needed. The actual number of levels, as well as the number of encoders 21 and MUXs 25 in each of the levels, will be determined by the actual number of bits in the operand mantissa and the type of encoders and MUXs chosen.

By predicting the sticky bit from the practice of the present invention, the sticky bit calculation is removed from the critical path of the multiplication operation so that the sticky bit is available when the final product is calculated. The use of parallel processing to predict the sticky bit is critical in processors which can perform the floating-point multiplication in a short number of clock cycles or even one clock cycle. As implemented, the sticky bit predictor of the preferred embodiment is utilized in a processor which can complete a new single-precision multiplication every one clock cycle and double-precision multiplication every two clock cycles. The latency of single and double precision multiplication on the numerical processor using this invention is 3 and 4 clocks respectively.

As explained earlier, the sticky bit predictor predicts the sticky bit assuming the mantissa product is in the range [1, 2). To find the sticky bit for the mantissa product range [2, 4), comparison could be made of the sum of the trailing zero counts to a different constant. Another way to find the sticky bit for the mantissa product range [2, 4) is to OR the sticky bit for the range [1, 2) with the round bit for the range [1, 2). In the application of this invention, this second approach is used. Two 8-bit carry look-ahead circuits are used to determine the range of the mantissa product and the round bit in 99.6% of the operations. If these carry look-ahead circuits cannot determine either the range of the mantissa product or the round bit, two extra clock cycles are used to perform these calculations.

In the normal case, the sticky bit and round bit are computed quickly enough so that a single carry propagate add can be used to both perform rounding and adding the two numbers whose sum is the upper portion of the mantissa product. The sticky bit predictor makes it possible to compute the mantissa product in parallel with computing whether the upper portion of the mantissa product should be incremented for rounding.

It is to be appreciated that various other structures are available to determine the number of trailing 0's and that the trailing zero encoder as shown in FIG. 4 is just one scheme for counting the number of trailing 0s.

Thus, a sticky bit predictor is described.

We claim:

1. A circuit for predicting a sticky bit value when multiplying two numbers comprising:
    a first trailing zero encoder for determining a number of trailing zeros in a first operand mantissa;
    a second trailing zero encoder for determining a number of trailing zeros in a second operand mantissa;
    an adder coupled to receive outputs of said first and second trailing zero encoders and providing a sum of said outputs to determine total number of trailing zeros in both said operand mantissas;
    a comparing means coupled to said adder for determining if said sum is greater than a predetermined number, wherein determining said sticky bit value.

2. The circuit of claim 1, wherein said adder is comprised of a carry save adder.

3. The circuit of claim 2, wherein said comparing means is a carry look-ahead circuit.

4. The circuit of claim 1, wherein said comparing means is a comparator.

5. In multiplying a multiplicand operand mantissa and a multiplier operand mantissa to perform a floating-point multiplication operation, a circuit for predicting a value of a sticky bit, which is defined as the OR'ing of bits less significant than the round bit of a product of said two operand mantissas, said circuit comprising:
    a first trailing zero encoder coupled to accept said multiplicand mantissa for determining a number of trailing zeros in said multiplicand mantissa;
    a second trailing zero encoder coupled to receive said multiplier mantissa for determining a number of trailing zeros in said multiplier mantissa;
    an adder coupled to receive outputs of said first and second trailing zero encoders as its input and providing a sum of total number of zeros;
    a comparing means coupled to said adder for determining if said sum is greater than a constant, wherein determining said sticky bit value.

6. The circuit of claim 5, wherein each of said trailing zero encoders is comprised of a plurality of encoders arranged in a plurality of rows, such that each row has at least one encoder, said encoders for determining a least significant bit position of a respective one of said operand mantissas which has a non-zero value and wherein all bits less significant than said least significant non-zero bit has a value of zero.

7. The circuit of claim 6, wherein encoders of a first row are coupled to accept said respective one of said operand mantissas and provide an output for determining least significant bits of a trailing zero count which provides said number of trailing zeros;
    encoders of each of said rows being grouped and coupled to encoders of a subsequent row wherein output from each subsequent row encoders provides subsequently more significant bits of said trailing zero count; and an encoder of a last row providing most significant bits of said trailing zero count.

8. In multiplying a multiplicant operand mantissa and a multiplier operand mantissa to perform a floating-point multiplication operation, a method for predicting a value of a sticky bit, which is defined as the OR'ing of bits less significant than the round bit of a product of said two operand mantissas, comprising the steps of:
    providing a trailing zero encoder for each of said operand mantissas for determining a number of trailing 0s in its respective operand mantissa;
    inputting a respective operand mantissa to its respective trailing zero encoder;
    determining in each of said trailing zero encoder a least significant non-zero bit in its respective operand mantissa;
    providing from each of said trailing zero encoder a count of a number of bits less significant than said least significant non-zero bit, said count being a number of trailing zeros for its respective operand mantissa;
    adding said number of trailing zeros of said two mantissas to provide a sum;
    comparing said sum to a constant to determine value of said sticky bit.

9. The method of claim 8, wherein said adding of said two trailing zero counts and said comparing to a constant is achieved by further including steps of coupling said two trailing zero counts to two inputs of a carry save adder and coupling a constant to a third input of said carry save adder:
    said carry save adder having a sum and carry outputs as its two outputs;
    said constant being selected so that the most significant bit of the sum of said two outputs of said carry save adder will have a value of one, if and only if said sticky bit is zero;
    said two outputs of said carry save adder being coupled to a circuit which determines if the most significant bit of the sum of said two outputs of said carry save adder is one.

10. The method of claim 9, wherein said circuit for determining if said most significant bit of sum of two outputs of said carry adder is a carry look-ahead circuit.

* * * * *

UNITED STATES PATENT AND TRADEMARK OFFICE
CERTIFICATE OF CORRECTION

PATENT NO. : 4,928,259
DATED : 5/22/90
INVENTOR(S) : Galbi et al.

It is certified that error appears in the above-identified patent and that said Letters Patent is hereby corrected as shown below:

| | | |
|---|---|---|
| col. 01, line 25 | delete "increase" | insert --increased-- |
| col. 04, line 38 | delete "Shiomo" | insert --Shlomo-- |
| col. 05, line 68 | delete "varous" | insert --various-- |

Signed and Sealed this

Twenty-fifth Day of May, 1993

Attest:

MICHAEL K. KIRK

*Attesting Officer*    *Acting Commissioner of Patents and Trademarks*